United States Patent
Woodhouse et al.

(10) Patent No.: US 11,471,342 B2
(45) Date of Patent: Oct. 18, 2022

(54) WHEELCHAIR TRACTION DEVICES AND SYSTEMS

(71) Applicant: Wheelchair Sole, LLC, Marietta, GA (US)

(72) Inventors: Catherine Woodhouse, Marietta, GA (US); Ijeoma Iheke, Marietta, GA (US)

(73) Assignee: Wheelchair Sole, LLC, Marietta, GA (US)

( * ) Notice: Subject to any disclaimer, the term of this patent is extended or adjusted under 35 U.S.C. 154(b) by 169 days.

(21) Appl. No.: 17/085,459

(22) Filed: Oct. 30, 2020

(65) Prior Publication Data

US 2021/0128377 A1 May 6, 2021

Related U.S. Application Data

(60) Provisional application No. 62/928,141, filed on Oct. 30, 2019.

(51) Int. Cl.
*A61G 5/02* (2006.01)
*B60B 15/26* (2006.01)

(52) U.S. Cl.
CPC .......... *A61G 5/027* (2013.01); *B60B 15/266* (2013.01)

(58) Field of Classification Search
CPC .............................. A61G 5/027; B60B 15/266
USPC ..................................................... 280/304.1
See application file for complete search history.

(56) References Cited

U.S. PATENT DOCUMENTS

| | | | |
|---|---|---|---|
| 4,641,850 A * | 2/1987 | Rice | A61G 5/10 24/23 EE |
| 5,261,470 A | 11/1993 | Genaw et al. | |
| 6,869,084 B2 * | 3/2005 | Volk | A61G 5/1067 280/5.24 |
| 8,651,154 B1 | 2/2014 | Chira et al. | |
| 9,469,170 B1 | 10/2016 | Tyszkiewicz | |
| D781,227 S | 3/2017 | Honeycutt | |
| 2019/0105951 A1 | 4/2019 | Brown | |

FOREIGN PATENT DOCUMENTS

JP 3110831 U 6/2005

* cited by examiner

*Primary Examiner* — Kevin Hurley
*Assistant Examiner* — Hosam Shabara
(74) *Attorney, Agent, or Firm* — Meunier Carlin & Curfman LLC

(57) ABSTRACT

Various implementations include a wheelchair traction attachment device. The device includes a frame having an arcuately-shaped longitudinal axis, an inner surface, an outer surface opposite and spaced apart from the inner surface. The frame has a first edge extending between the inner and outer surfaces, and a second edge spaced apart from the first edge. At least a portion of the inner surface defines a channel. The device includes at least one first wheel-clip extending radially inwardly from the first edge of the frame relative to the arcuately-shaped longitudinal axis. The device includes at least one second wheel-clip extending radially inwardly from the second edge of the frame relative to the arcuately-shaped longitudinal axis. The device includes a traction portion disposed along at least a portion of the outer surface, the traction portion extending radially outwardly from the outer surface relative to the arcuately-shaped longitudinal axis.

20 Claims, 8 Drawing Sheets

WHEELCHAIR TRACTION DEVICES AND SYSTEMS

RELATED APPLICATIONS

This application claims the benefit of U.S. Provisional Patent Application Ser. No. 62/928,141 filed Oct. 30, 2019 and entitled WHEELCHAIR MOBILITY DEVICE, which is incorporated by reference herein in its entirety and for all purposes.

FIELD OF THE INVENTION

The present disclosure relates generally to medical mobility devices and more specifically to wheelchair traction devices and systems.

BACKGROUND OF THE INVENTION

Non-pristine terrain remains a formidable and potentially dangerous adversary of the estimated 10 million manual wheelchair users in developed nations and many times more in developing nations worldwide. Wheelchair users often cloister themselves in their home for even the mere possibility of inclement weather. Being caught in a sudden rain shower or snowfall with regular smooth-surfaced wheelchair wheels makes safe navigation difficult and puts them at high risk for falls and bodily injury. Other irregular terrain such as grass, sand, and gravel, also prohibits them from safely participating in many outdoor and social activities that improve quality of life. A user getting "stuck" in non-pristine terrain may suffer needless dependence, embarrassment, and shame in requiring sympathetic assistance from bystanders.

Wheel traction devices are currently used for various applications. Typically, these devices are fastened to a wheel by a strap or a pin. These designs can take a significant amount of time and effort to install. Additionally, many such devices are formed from heavy materials such as steel or other metals. The complex attachment mechanisms and heavy weight make typical traction devices unsuitable for applications where quick deployment by an individual user is required. As such, traditional wheel traction devices can be cumbersome to deploy in an application where a user needs traction immediately.

Traditional wheel traction devices are also not specifically designed for attachment to the narrow wheels and tires provided on most wheelchairs. As such, traditional wheel traction devices are not practicable in instances where a wheelchair user needs to quickly deploy them. For example, a wheelchair user may approach a slippery surface, approach a steep incline or decline, or weather conditions may change suddenly causing slippery surfaces to form. In these instances, traditional wheel traction devices do not provide a practical solution for the wheelchair user.

Thus, there is a need for a viably portable and easily attachable wheelchair traction device that quickly provides traction to a wheelchair user.

SUMMARY OF THE INVENTION

Various implementations include a wheelchair traction attachment device. The device includes a frame having an arcuately-shaped longitudinal axis, an inner surface, an outer surface opposite and spaced apart from the inner surface. The frame has a first edge extending between the inner and outer surfaces, and a second edge spaced apart from the first edge. At least a portion of the inner surface defines a channel. The device includes at least one first wheel-clip extending radially inwardly from the first edge of the frame relative to the arcuately-shaped longitudinal axis. The device includes at least one second wheel-clip extending radially inwardly from the second edge of the frame relative to the arcuately-shaped longitudinal axis. The device includes a traction portion disposed along at least a portion of the outer surface, the traction portion extending radially outwardly from the outer surface relative to the arcuately-shaped longitudinal axis. The channel is sized such that at least a portion of a wheelchair wheel is disposable within the channel, and the at least one first wheel clip and the at least one second wheel clip are positioned to removably couple the wheelchair wheel and the frame when the portion of the wheelchair wheel is disposed within the channel.

In some implementations, at least a portion of the inner surface of the frame is arcuate as viewed in a plane perpendicular to the longitudinal axis. In some implementations, the traction portion is a traction insert and the outer surface of the frame defines a groove extending parallel to the arcuately-shaped longitudinal axis, wherein the traction insert is disposable within the groove. In some implementations, the traction portion is coupled to the outer surface of the frame with adhesive. In some implementations, the traction insert is removably coupled to the outer surface of the frame by a dovetail joint. In some implementations, the traction portion comprises rubber.

In some implementations, the device includes at least one gripping handle. In some implementations, the at least one gripping handle includes at least one hole defined by the frame. In some implementations, the frame has a degree of curvature as measured from the first end to the second end in a plane that includes the longitudinal axis that is less than 180 degrees such that two or more frames are couplable to the wheelchair wheel. In some implementations, each of the at least one first wheel-clip and the at least one second wheel-clip include a tab extending inwardly toward the arcuately-shaped longitudinal axis.

Various other implementations include a wheelchair wheel traction system. The system includes two or more wheelchair traction attachments devices. Each device includes a frame having an arcuately-shaped longitudinal axis, an inner surface, an outer surface opposite and spaced apart from the inner surface. The device includes a first edge extending between the inner and outer surfaces, and a second edge spaced apart from the first edge. At least a portion of the inner surface defines a channel. The device includes at least one first wheel-clip extending radially inwardly from the first edge of the frame relative to the arcuately-shaped longitudinal axis. The device includes at least one second wheel-clip extending radially inwardly from the second edge of the frame relative to the arcuately-shaped longitudinal axis. The device includes a traction portion disposed along at least a portion of the outer surface. The traction portion extends radially outwardly from the outer surface relative to the arcuately-shaped longitudinal axis.

In some implementations, the channel is sized such that at least a portion of a wheelchair wheel is disposable within the channel, and the at least one first wheel clip and the at least one second wheel clip are positioned to removably couple the wheelchair wheel to the frame when the portion of the wheelchair wheel is disposed within the channel. In some implementations, the frame has a degree of curvature that is less than 180 degrees, as measured from the first end to the second end in a plane that includes the longitudinal axis, such that two or more of the frames are couplable to the same wheelchair wheel. In some implementations, each of the devices are removable from the wheelchair wheel independently from the other devices. In some implementations, at least a portion of the inner surface of the frame is arcuately-shaped as viewed in a plane perpendicular to the longitudinal axis. In some implementations, the traction portion is a traction insert and the outer surface of the frame defines a groove extending parallel to the arcuately-shaped longitudinal axis, wherein the traction insert is disposable within the groove. In some implementations, the traction portion is coupled to the outer surface of the frame with adhesive. In some implementations, the traction insert is removably coupled to the outer surface of the frame by a dovetail joint. In some implementations, the traction portion comprises rubber. In some implementations, each of the devices includes at least one gripping handle. In some implementations, the at least one gripping handle comprises at least one hole defined by the frame. In some implementations, each of the at least one first wheel-clip and the at least one second wheel-clip include a tab extending inwardly toward the arcuately-shaped longitudinal axis.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While the term "axis" or "axes" normally refer to straight lines, the term "axis" or "axes" as used herein can describe axes that are curved such as an arcuate-shaped longitudinal axis.

Wheelchair traction attachment systems and wheelchair traction attachment devices are described herein that are portable and quickly attachable to a wheelchair wheel by an individual wheelchair user. The wheelchair traction system includes a plurality of wheelchair traction attachment devices that can be coupled to a wheelchair during use of the wheelchair. The devices include clips that are positioned along the device to couple directly onto a traditional wheelchair wheel without the need for adaptors, or additional parts. The devices are portable such that they can be stored compactly and deployed in an instance where additional traction is desired. For example, the system includes multiple portable segments that allow the system to be practically transported with a wheelchair or on a wheelchair user's person. Each device can be installed and removed by an individual wheelchair user, due to each device's light weight and clipping mechanism.

Figure 1:
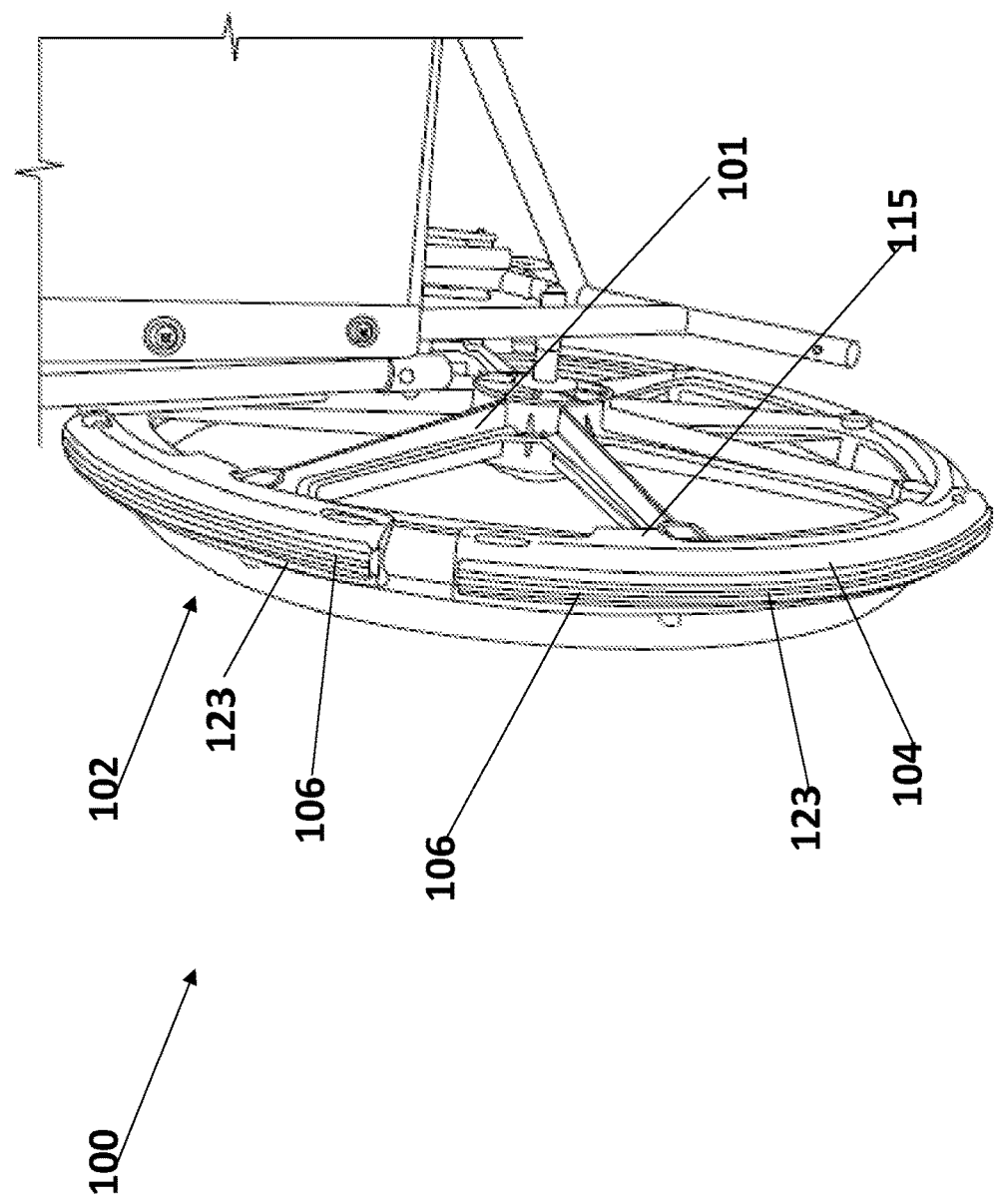
FIG. 1 shows a rear perspective view of the wheelchair traction system, which includes a plurality of wheelchair traction devices, according to one implementation.
Figure 2:
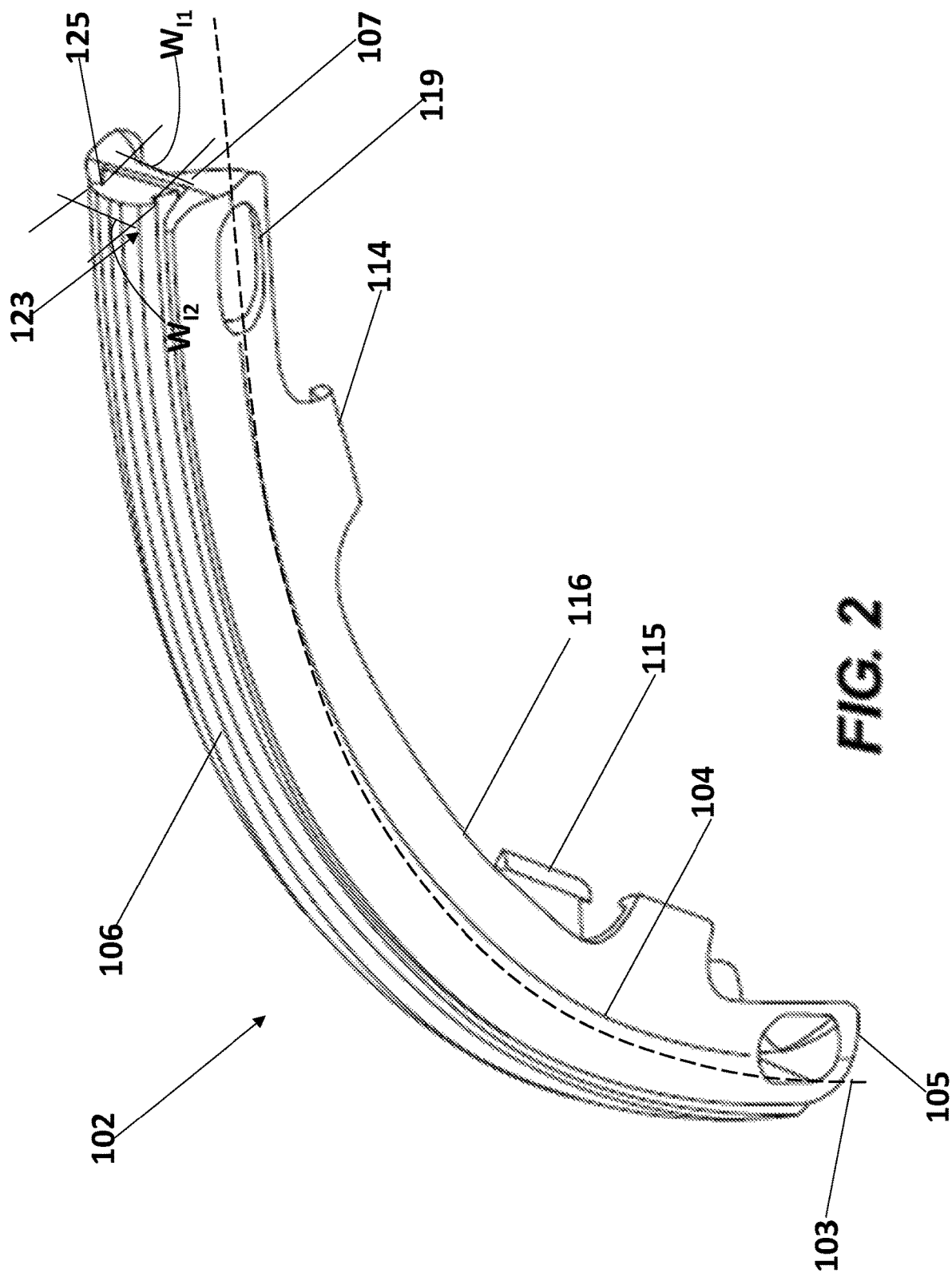
FIG. 2 shows an outside perspective view of one of the devices shown in FIG. 1.
Figure 3:
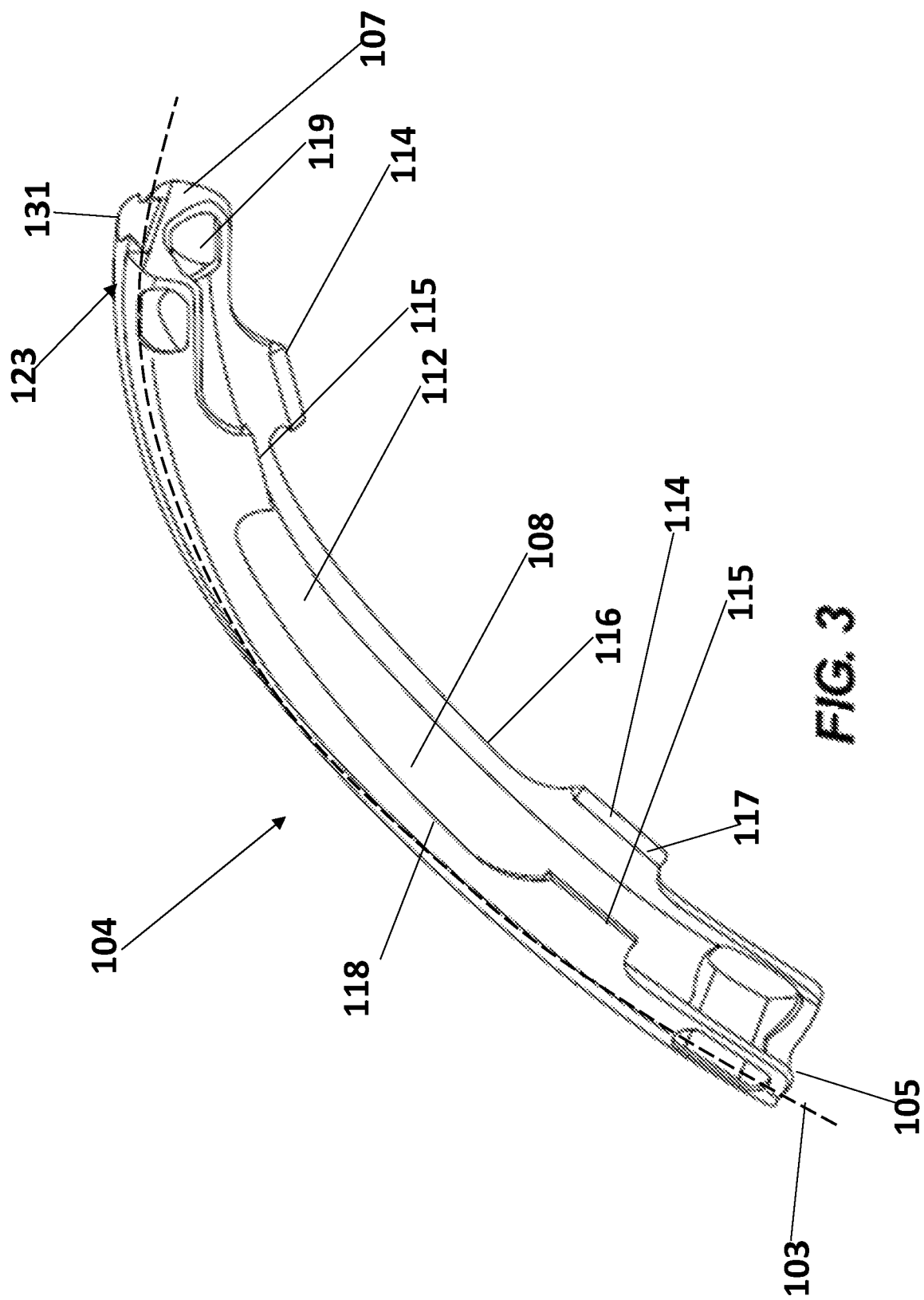
FIG. 3 shows an inside perspective view of the device shown in FIG. 2.

FIGS. 1-3 show a wheelchair traction system 100 and its components according to one implementation. The wheelchair traction system 100 includes four independently attachable wheelchair traction attachment devices 102. Each device 102 includes a frame 104, two first wheel-clips 114, two second wheel-clips 115, and a traction portion 106.

The frame 104 provides a central body for each device 102. The frame has an inner surface 108 and an outer surface 110 opposite and spaced apart from the inner surface 108, a first edge 116 that extends between the inner and outer surfaces 108, 110, and a second edge 118 opposite and spaced apart from the first edge 116 that extends between the inner and outer surfaces 108, 110, a first end 105 that extends between the first and second edges 116, 118 and the inner and outer surfaces 108, 110, and a second end 107 that is opposite and spaced apart from the first end 105 and extends between the first and second edges 116, 118 and the inner and outer surfaces 108, 110. The frame 104 also has an arcuately-shaped longitudinal axis 103 extending through the first and second ends 105, 107.

The frame 104 is made, at least in part, of a polymer material. However, in other implementations, the frame includes a metal such as aluminum, a composite (e.g. aluminum and polymer, carbon and polymer), or any other material suitable for forming a frame couplable to a wheelchair wheel.

The frame 104 has a degree of curvature, as measured from the first end 105 to the second end 107 in a plane that includes the longitudinal axis 103, of 80 degrees. In addition, the frame 104 has an arc length of about 13 inches, as measured from the first end 105 to the second end 107 along the longitudinal axis 103. However, in other implementations, the degree of curvature of the frame may be 45 degrees, 60 degrees, 90 degrees, 120 degrees, or less than 180 degrees such that it is suitable for installation and removal on a wheelchair wheel 101. Furthermore, in other implementations, the frame 104 may have an arc length between about 5 inches and 20 inches or any other arc length sufficient to provide a traction portion about an outer surface of a wheelchair wheel.

Further, the inner surface 108 has an arcuately shaped cross-sectional shape as viewed in a plane that is perpendicular to the longitudinal axis 103. For example, the inner surface 108 is U-shaped as viewed in the plane that is perpendicular to the longitudinal axis 103. However, in other implementations, the cross-sectional shape of the inner surface can be any shape that is suitable for defining a channel that can accept a portion of a wheelchair tire and wheel 101.

The inner surface 108 defines a longitudinally extending channel 112. The channel 112 is sized to receive at least a portion of a wheelchair wheel 101 within it. The inner surface 108 forms a friction fit with the portion of the wheelchair wheel 101, which secures the device 102 in place during operation.

The radius of curvature of the inner surface 108 of the device 102, as measured in the plane that includes the longitudinal axis 103, is the same or similar to a radius of a standard wheelchair wheel. In the example shown in FIGS. 1-3, the radius of curvature of the inner surface 108 is about 12 inches. However, in other implementations, the radius of curvature of the inner surface is between about 6 inches 18 inches or any other radius of curvature suitable for forming a surface against an outer circumference of a wheelchair wheel.

As shown in FIGS. 1-3, two first clips 114 and two second clips 115 extend from respective edges 116, 118 in a radially inward direction. The radial direction as used herein in reference to elements of the device 102 refers to the direction of the radius of the curvature of the device 102. The clips 114, 115 securely couple the device 102 to the wheelchair wheel 101 by engaging a radially inner surface of the wheelchair wheel 101 that is opposite and spaced apart from the radially outer surface of a tire of the wheelchair wheel 101. Each clip 114 extends from the respective edge 116, 118 in a direction having a vector component that points radially inwardly. In the implementation shown in FIGS. 1-3, the clips 114, 115 are integrally formed with the respective edges 116, 118 and do not extend along the full arc length of each edge 116, 118. However, in other implementations, each clip may extend the full arc length of each edge.

Each clip 114, 115 includes a tab 117 extending inwardly toward the longitudinal axis 103. The clips 114, 115 are biased in a direction toward each other to engage the tabs 117 onto the radially inner surface of the wheel 101 and secure the device 102 to the wheel 101. And, the clips 114, 115 are urgable outwardly to disengage the tabs 117 from the radially inner surface of the wheel 101, allowing the device 102 to be removed from the wheel 101. However, clips according to other implementations may not have tabs or may have any number of tabs.

Figure 4:
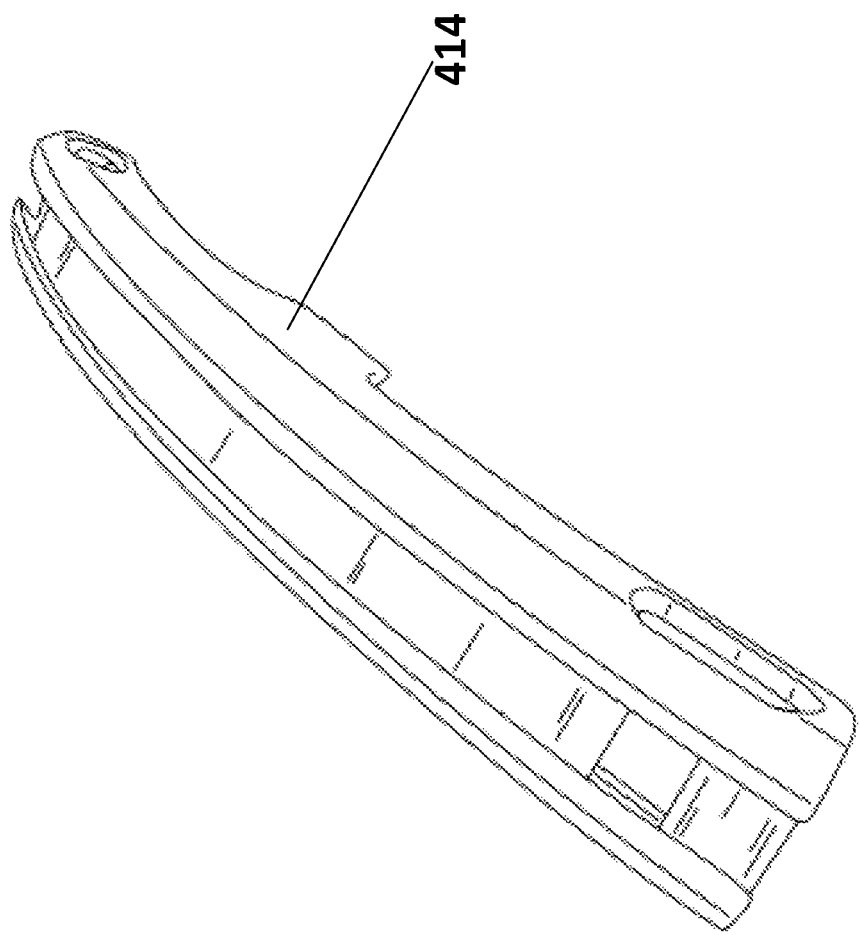
FIG. 4 shows an outside perspective view of a frame according to another implementation.
Figure 5:
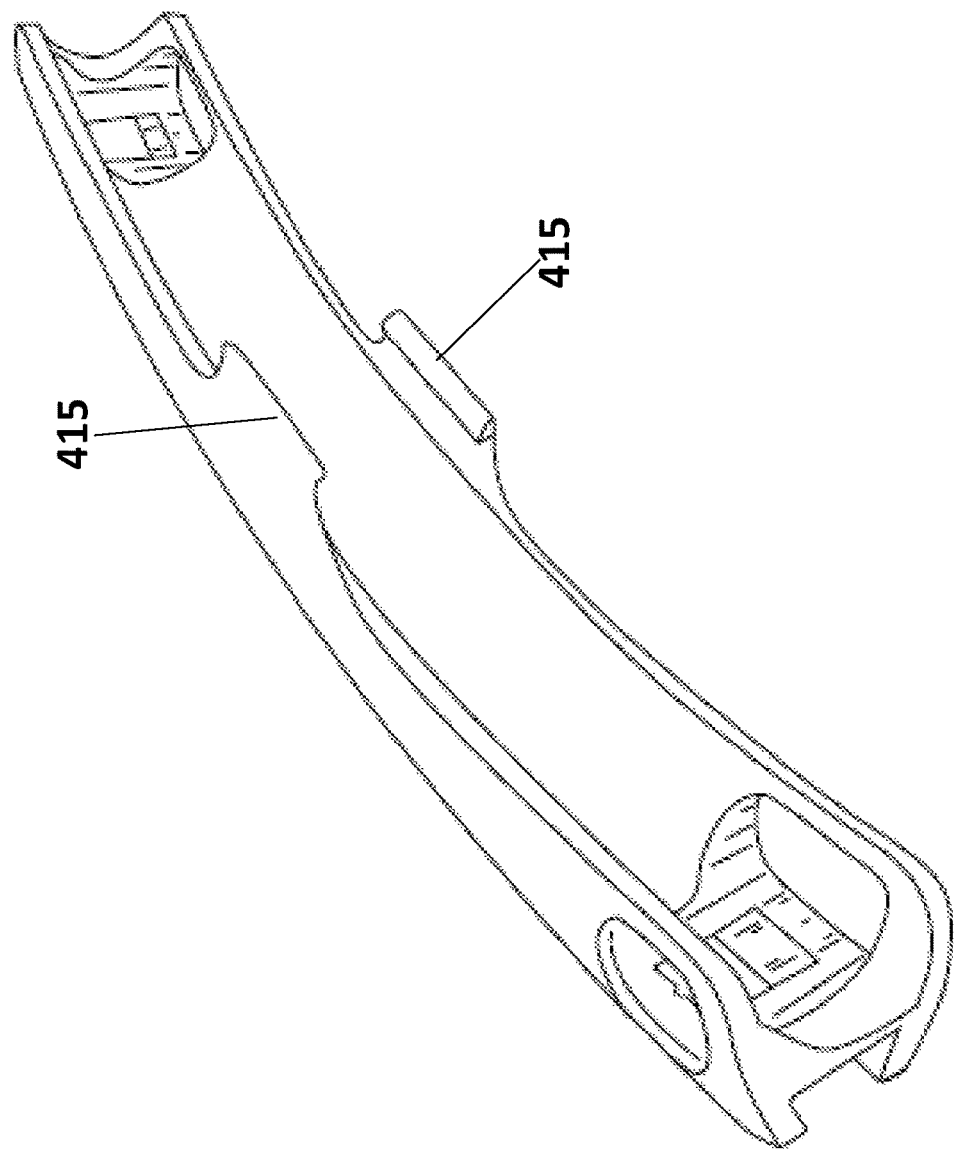
FIG. 5 shows an inside perspective view of the frame shown in FIG. 4.

In the example shown in FIGS. 1-3, the clips 114 are aligned with clips 115 along the longitudinal axis 103, but in other implementations, the clips are not aligned along the longitudinal axis 103. And, in other implementations, the clips may extend from other portions of the frame 104. Furthermore, in other implementations, the frame may include two clips (e.g., clips 414, 415 shown in FIGS. 4 and 5), three clips, four clips (e.g., clips 114, 115 shown in FIGS. 1-3 and clips 314, 315 shown in FIGS. 7-8), five clips, ten clips (e.g., clips 214 shown in FIG. 6) or any number of clips suitable for securing a frame to a wheelchair wheel.

The frame 104 shown in FIGS. 1-3 has four gripping handles 119. The gripping handles 119 are holes defined through the inner surface 108 and the outer surface 110. Each of the gripping handles 119 are elliptical shaped cut-outs that can be used by a user to manipulate the device 102 during installation and removal of the device 102.

Figure 6:
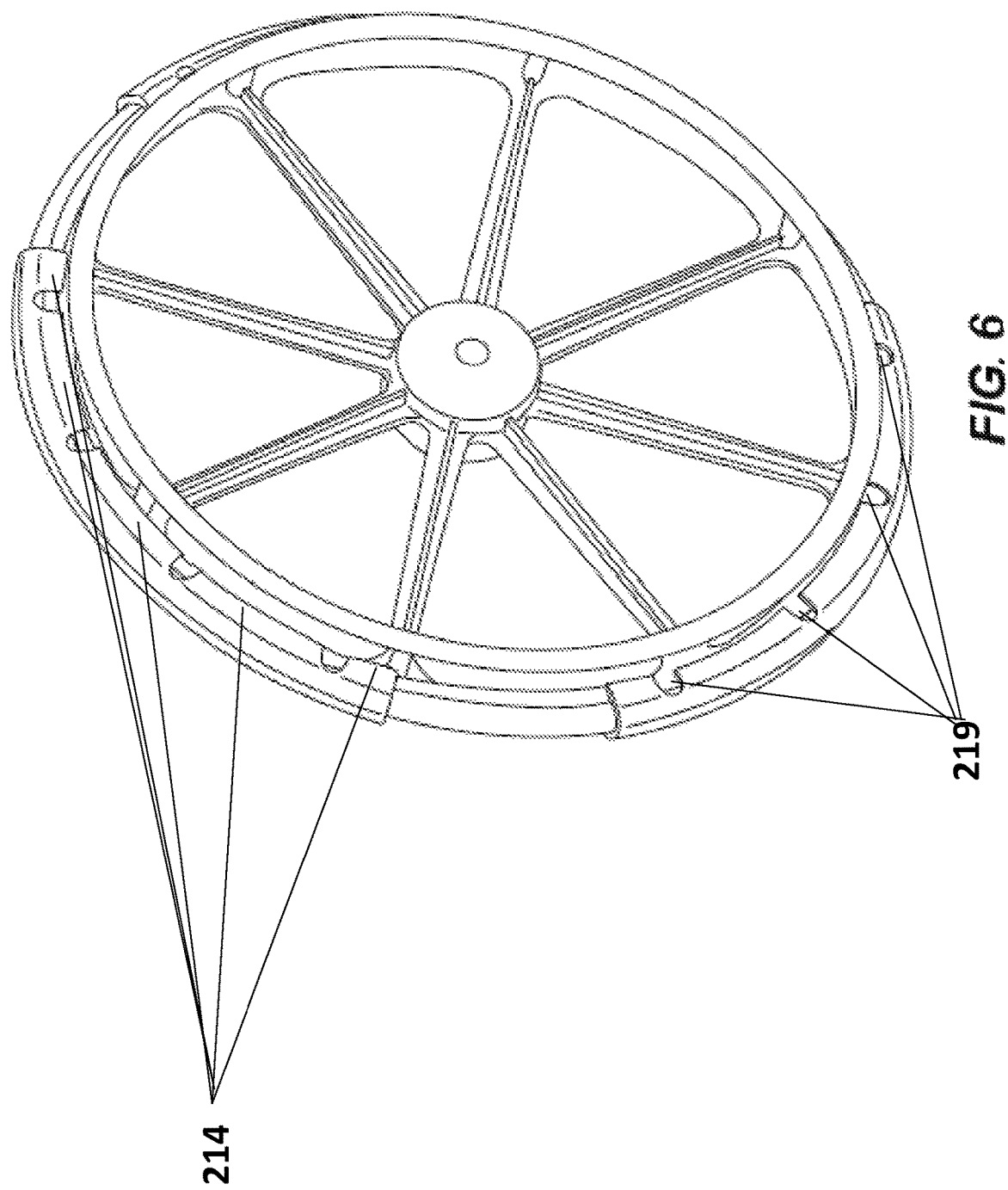
FIG. 6 shows a plurality of wheelchair attachment devices according to another implementation coupled to a wheelchair wheel.
Figure 7:
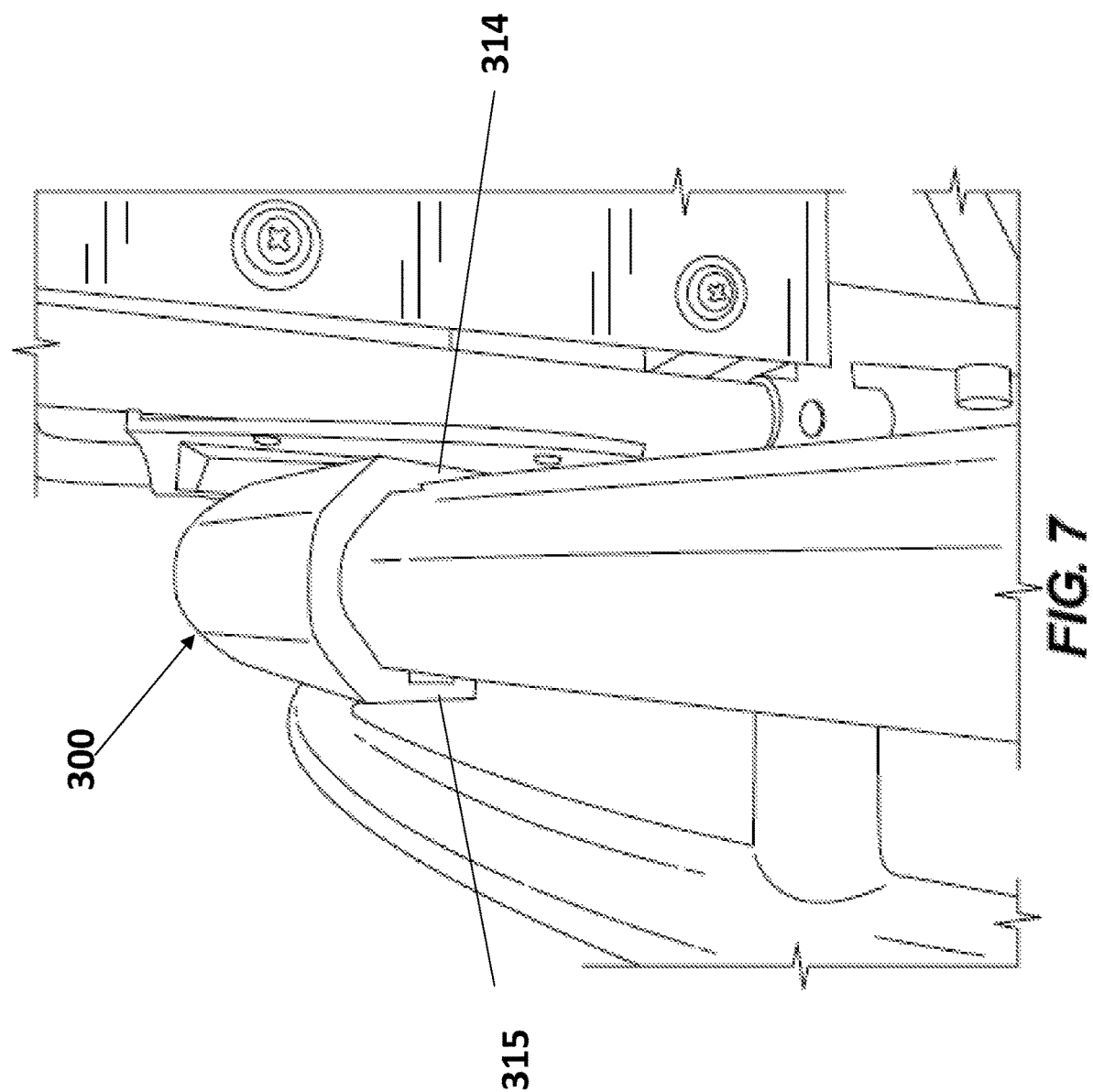
FIG. 7 shows a rear detail view of a wheelchair attachment device according to another alternative implementation coupled to a wheelchair wheel.
Figure 8:
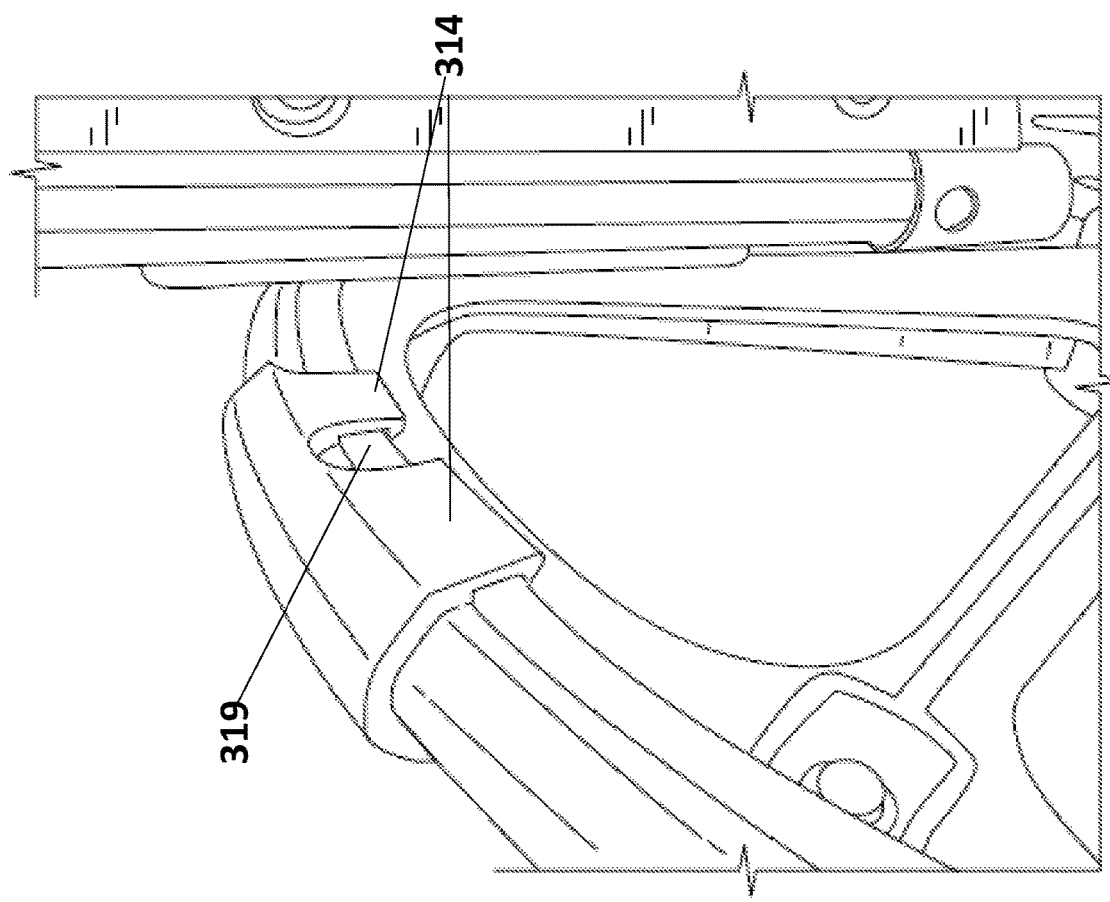
FIG. 8 shows a rear perspective detail view of the wheelchair attachment device shown in FIG. 7.

Although FIGS. 1-3 show an implementation having four gripping handles 119, FIG. 6 shows another implementation having eight gripping handles 219, and FIG. 8 shows another implementation of a wheelchair traction device 300 having two gripping handles 319. And, in other implementations, the device 102 can have any number of gripping handles suitable for manipulating, installing, or removing the device 102 from the wheelchair wheel 101. Furthermore, in other implementations, the gripping handles may be protrusions, depressions in the surface of the device, slots that extend between clips (e.g., gripping handles 219, 319 as shown in FIGS. 6-8) or any other handle suitable to aid in manipulation, installation, or removal of the device. And, in other implementations, the device does not include gripping handles.

As shown in FIGS. 1-3, the traction portion 106 extends circumferentially parallel to the longitudinal axis 103 of the device 102. The traction portion 106 extends from the outer surface 110 of the frame 104 in a direction having a vector component that points radially outwardly. The traction portion 106 provides a traction material for gripping a rolling surface such as a floor or a ramp and provides an interface between the device 102 and the rolling surface. For example, the traction material shown in FIGS. 1-3 is rubber, but in other implementations, the material may be a polymer, a composite material, or any other material suitable to provide traction to the wheelchair wheel.

In the implementation shown in FIGS. 1-3, the traction portion 106 comprises a traction insert 123 that is separately formed from the frame 104. And, the outer surface 110 of the frame 104 defines a groove 121, which extends parallel to the longitudinal axis 103. The groove 121 and at least a portion of the traction insert 123 have complementary shapes such that the portion of the traction insert 123 is held securely within the groove 121. For example, the groove 121 is dovetail shaped, and the traction insert 123 includes a complementary dovetail shaped inner portion that engages the groove 121. The dovetail groove 121 has a minimum width along the radially outermost edge of the groove and a maximum width along the radially innermost portion of the groove. The minimal width is between 0.4 and 0.6 inches (e.g., 0.50 inches), and the maximum width is between 0.5 and 0.7 inches (e.g., 0.62 inches). The traction insert 123 has a minimum width along the interface of the inner and outer portions of the traction insert 123 and a maximum width along the radially innermost edge of the inner portion of the traction insert 123. The inner surface of the traction insert 123 is further coupled to the outer surface 110 of the frame 104 by an adhesive. The traction insert has a radial thickness between about 0.20 inches and 0.50 inches (e.g., 0.36 inches), a minimum width between about 0.30 inches and 0.6 inches (e.g., 0.46 inches), and a maximum width between about 0.50 inches and 0.75 inches (e.g., 0.64 inches).

The traction insert 123 has an outer portion 131 that is disposed radially outwardly of the groove 121. The outer portion 131 of the traction portion 106 is a ribbed surface having ribbed contours that extend along the longitudinal axis of the traction insert 123.

In the example shown in FIGS. 1-3, the inner surface of the traction insert 123 is coupled to the outer surface 110 of the frame 104 by an adhesive. But in other implementations, the traction insert 123 is coupled to the frame 104 by a friction fit, by interference fit, heat treatment, fasteners, or by any other suitable form of coupling between a frame and an insert. For example, in some implementations, coupling holes are formed that extend between the inner surface 108 and the outer surface 110 of the frame 104. The inner surfaces of the traction inserts include protrusions (not shown) that insert into the coupling holes and secure the insert. In these and other implementations, the inserts 123 are removable and replaceable with similarly treaded inserts or inserts having alternative tread and/or material characteristics.

The tread of the traction portion 106 shown in FIGS. 1-3 has a ribbed surface. But in other implementations, the tread has a chevron pattern, tread blocks, cross slots, or any other tread pattern suitable for providing traction to a wheelchair wheel. Furthermore, each of the traction portions 106 can include a plurality of tread patterns.

As shown in FIGS. 6-8, the traction portion is integrally formed with the frame. In this implementation, the outer surface of the frame forms the outer traction portion and does not include a traction insert or an outer channel.

In the example shown in FIGS. 1-3, the outer surface 110 has an arcuately-shaped cross-section as viewed in the plane that is perpendicular to the longitudinal axis 103. But in other implementations, the outer surface may have a square cross-sectional shape, an asymmetrical cross-sectional shape to provide desired surface characteristics such as an off-camber traction portion, or any other shape suitable for providing a traction portion for a wheelchair wheel.

Also included herein are methods of coupling the devices 102 to wheelchair wheels. According to one example, a user, either seated in the wheelchair or unseated from the wheelchair, obtains a plurality of independently attachable devices 102. The user grasps the gripping handles 119 and advances the inner surface 108 toward and around a portion of the wheelchair wheel 101 including the tire. The user advances the device 102 onto the outer surface of the wheelchair wheel 101 such that the clips 114, 115 and the inner surface 108 slide radially inwardly toward the axis of the wheelchair wheel. The clips 114, 115 elastically deform to accommodate the shape of the wheelchair wheel 101. When the device 102 is disposed around the wheelchair wheel 101, the clips 114, 115 grasp an inner rim surface of the wheel 101 and secure the device 102 such that channel 112 of the inner surface 102 of the frame 104 abuts the outer surface of the tire of the wheelchair wheel 101. The user rotates the wheel 101 and repeats this process until the desired number of devices 102 are coupled to the wheel 101. Adjacent devices 102 may be arranged such that adjacent ends of the devices 102 abut each other or are spaced apart by a gap that does not disrupt rotation of the wheel on the surface.

A user removes the devices 104 by grasping the gripping handles 119 and pulling the handles away (e.g., in a radially outward direction) from the wheelchair wheel 101. The clips 114, 115 disengage, and the device 102 is displaced such that no portion of the wheelchair wheel 101 is disposed in the channel 112. The user rotates the wheel 101 and repeats this process until the desired number of devices 102 are removed from the wheel 101.

In some implementations, the user inserts a traction insert 123 into the groove 121 to provide the desired traction portion 106. In some implementations, the user removes the traction insert 123 and replaces it with a different traction insert 123 having the same tread pattern or a different desired tread pattern.

Although shown and described is what is believed to be the most practical and preferred implementations, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

The invention claimed is:

1. A wheelchair traction attachment device, the device comprising:
   a frame having an arcuately-shaped longitudinal axis, an inner surface, an outer surface opposite and spaced apart from the inner surface, a first edge extending between the inner and outer surfaces, and a second edge spaced apart from the first edge, wherein at least a portion of the inner surface defines a channel;
   at least one first wheel-clip extending radially inwardly from the first edge of the frame relative to the arcuately-shaped longitudinal axis;
   at least one second wheel-clip extending radially inwardly from the second edge of the frame relative to the arcuately-shaped longitudinal axis; and
   a traction portion disposed along at least a portion of the outer surface, the traction portion extending radially outwardly from the outer surface relative to the arcuately-shaped longitudinal axis,
   wherein the channel is sized such that at least a portion of a wheelchair wheel is disposable within the channel, and the at least one first wheel clip and the at least one second wheel clip are positioned to removably couple the wheelchair wheel and the frame when the wheelchair wheel is disposed within the channel.

2. The device of claim 1, wherein at least a portion of the inner surface of the frame is arcuate as viewed in a plane perpendicular to the longitudinal axis.

3. The device of claim 1, wherein the traction portion is a traction insert and the outer surface of the frame defines a groove extending parallel to the arcuately-shaped longitudinal axis, wherein the traction insert is disposable within the groove.

4. The device of claim 1, wherein the traction portion is coupled to the outer surface of the frame with adhesive.

5. The device of claim 3, wherein the traction insert is removably coupled to the outer surface of the frame by a dovetail joint.

6. The device of claim 1, wherein the traction portion comprises rubber.

7. The device of claim 1, further comprising at least one gripping handle.

8. The device of claim 7, wherein the at least one gripping handle comprises at least one hole defined by the frame.

9. The device of claim 1, wherein the frame has a degree of curvature as measured from the first end to the second end in a plane that includes the longitudinal axis that is less than 180 degrees such that two or more frames are couplable to the wheelchair wheel.

10. The device of claim 1, wherein each of the at least one first wheel-clip and the at least one second wheel-clip include a tab extending inwardly toward the arcuately-shaped longitudinal axis.

11. A wheelchair wheel traction system, the system comprising:
- two or more wheelchair traction attachments devices, each of the devices comprising:
  - a frame having an arcuately-shaped longitudinal axis, an inner surface, an outer surface opposite and spaced apart from the inner surface, a first edge extending between the inner and outer surfaces, and a second edge spaced apart from the first edge, wherein at least a portion of the inner surface defines a channel;
  - at least one first wheel-clip extending radially inwardly from the first edge of the frame relative to the arcuately-shaped longitudinal axis;
  - at least one second wheel-clip extending radially inwardly from the second edge of the frame relative to the arcuately-shaped longitudinal axis; and
  - a traction portion disposed along at least a portion of the outer surface, the traction portion extending radially outwardly from the outer surface relative to the arcuately-shaped longitudinal axis,
- wherein the channel is sized such that at least a portion of a wheelchair wheel is disposable within the channel, and the at least one first wheel clip and the at least one second wheel clip are positioned to removably couple the wheelchair wheel to the frame when the wheelchair wheel is disposed within the channel, and
- wherein the frame has a degree of curvature as measured from the first end to the second end in a plane that includes the longitudinal axis that is less than 180 degrees such that two or more of the frames are couplable to the same wheelchair wheel.

12. The system of claim 11, wherein each of the devices are removable from the wheelchair wheel independently from the other devices.

13. The system of claim 11, wherein at least a portion of the inner surface of the frame is arcuate as viewed in a plane perpendicular to the longitudinal axis.

14. The system of claim 11, wherein the traction portion is a traction insert and the outer surface of the frame defines a groove extending parallel to the arcuately-shaped longitudinal axis, wherein the traction insert is disposable within the groove.

15. The system of claim 11, wherein the traction portion is coupled to the outer surface of the frame with adhesive.

16. The system of claim 14, wherein the traction insert is removably coupled to the outer surface of the frame by a dovetail joint.

17. The system of claim 11, wherein the traction portion comprises rubber.

18. The system of claim 11, wherein each of the devices further comprise at least one gripping handle.

19. The system of claim 18, wherein the at least one gripping handle comprises at least one hole defined by the frame.

20. The system of claim 11, wherein each of the at least one first wheel-clip and the at least one second wheel-clip include a tab extending inwardly toward the arcuately-shaped longitudinal axis.

* * * * *